United States Patent [19]

Grot et al.

[11] Patent Number: 4,469,744

[45] Date of Patent: Sep. 4, 1984

[54] PROTECTIVE CLOTHING OF FABRIC CONTAINING A LAYER OF HIGHLY FLUORINATED ION EXCHANGE POLYMER

[75] Inventors: Walther G. Grot, Chadds Ford; Joseph T. Rivers, West Chester, both of Pa.; Raimund H. Silva, Hattingen, Fed. Rep. of Germany

[73] Assignee: E. I. Du Pont de Nemours and Company, Wilmington, Del.

[21] Appl. No.: 290,866

[22] Filed: Aug. 7, 1981

Related U.S. Application Data

[63] Continuation-in-part of Ser. No. 168,639, Jul. 11, 1980, abandoned, which is a continuation-in-part of Ser. No. 138,681, Apr. 9, 1980, abandoned.

[51] Int. Cl.$^3$ .......................... B32B 7/00; B32B 27/00
[52] U.S. Cl. ..................................... 428/246; 210/679; 210/681; 428/248; 428/249; 428/252; 428/262; 428/265; 428/286; 428/290; 428/421; 428/422
[58] Field of Search ............... 428/421, 422, 248, 249, 428/246, 252, 262, 265, 286, 290; 210/679, 681

[56] References Cited

U.S. PATENT DOCUMENTS

| | | | |
|---|---|---|---|
| 3,735,558 | 5/1973 | Skarstrom et al. | 55/16 |
| 3,953,566 | 4/1976 | Gore | 264/288 |
| 3,962,153 | 6/1976 | Gore | 428/398 |
| 4,194,041 | 3/1980 | Gore et al. | 428/315 |

FOREIGN PATENT DOCUMENTS

| | | |
|---|---|---|
| 2146613 | 3/1973 | Fed. Rep. of Germany . |
| 2737756 | 3/1979 | Fed. Rep. of Germany . |
| 1440963 | 6/1976 | United Kingdom . |
| 2029764A | 3/1980 | United Kingdom . |

OTHER PUBLICATIONS

"Perma Pure Dryer, Air Pollution–Ground Station Monitoring", Perma Pure Products, Inc.
"Perma Pure Dryer, Auto Emission–Exhaust Gas Monitoring", Perma Pure Products, Inc.
"Air Pollution Sample Dryer", Perma Pure Products, New Product Release.
"Mini Dryer" Model MD, Perma Pure Products.
Perma Pure Dryers, Multi-Tube Dryer–Model PD Perma Pure Products, Inc.
"Continuous Drying of Process Sample Streams", Kertzman, Perma Pure Products, Inc., 1973.
"Measuring Trace Impurities in Air by Infrared Spectroscopy at 20 Meters Path and 10 Atmospheres Pressure", Baker, Am. Ind. Hygiene Assoc. J., pp. 735–740, Nov. 1974.
"Drier for Field Use in the Determination of Trace Atmospheric Gases", Foulger & Simmonds, Analytical Chemistry, vol. 51, No. 7, pp. 1089–1090, Jun. 1979.
"Chemical Warfare and Chemical Disarmament", Meselson & Robinson, Scientific American, vol. 242, No. 4, pp. 38–47, Apr. 1980.

*Primary Examiner*—Marion McCamish

[57] ABSTRACT

A protective garment fabricated at least in part from a fabric which contains a layer of a highly fluorinated ion exchange polymer having functionality of the sulfonic and/or carboxylic type in the form of an alkali metal, ammonium or amine salt.

33 Claims, No Drawings

PROTECTIVE CLOTHING OF FABRIC CONTAINING A LAYER OF HIGHLY FLUORINATED ION EXCHANGE POLYMER

CROSS-REFERENCE TO RELATED APPLICATIONS

This application is a continuation-in-part of our prior copending application U.S. Ser. No. 06/168,639 filed July 11, 1980, now abondoned which in turn is a continuation-in-part of our prior application U.S. Ser. No. 06/138,681 filed Apr. 9, 1980, now abandoned.

BACKGROUND OF THE INVENTION

Protective clothing of many types is now well-known for many and varied uses in protecting people from fire and harmful substances, such as suits for industrial workers, flame- and fire-resistant suits for firemen, forest fire fighters, race car drivers and airplane pilots, and suits for use by military personnel. Garments include not only complete, hermetic suits, but also individual garments such as trousers, jackets, gloves, boots, hats, head coverings, masks, etc.

Regulations restricting exposure to hazardous environments of various kinds, such as the Occupational Safety and Health Act, make it increasingly necessary to have better and more effective kinds of protective garments.

Such garments presently available are almost invariably of thick construction and heavy in weight, and are often fabricated at least in part from materials impermeable to water or water vapor, such as natural and synthetic rubbers and elastomers, chlorinated rubbers, etc. In the case of garments impermeable to water vapor, there is considerable discomfort to those wearing them, especially when the garments are of the hermetic variety, because of the entrapment of perspiration and body heat. Entrapment of heat and perspiration results in considerable discomfort of itself, and the heat stress which results from the prevention of loss of heat by the ordinary mechanism of evaporation of perspiration can rapidly reach a dangerous stage of heat prostration for the person wearing the garment.

It is an object of this invention to provide improved protective garments which possess the ability to permit the passage of water vapor through the fabric of the garment, and thereby provide improved comfort for the person wearing the garment.

It is another object of this invention to provide improved protective garments which possess not only the ability to permit the passage of water vapor through the fabric, but also the ability to act as a stable barrier to the passage of most organic substances, including toxic compounds, through the fabric. Such garments could protect those exposed to a wide variety of organic or harmful compounds.

It is a further object to provide such garments which are thin and light weight and which thus will more readily permit loss of heat by virtue of their light weight construction.

SUMMARY OF THE INVENTION

Briefly, the invention comprises using as a component of the fabric of a protective garment a layer of an ion exchange polymer, preferably a semipermeable ion exchange polymer. By "semipermeable" is meant permeable to water vapor but substantially impermeable to most organic substances.

More specifically, the present invention provides for the use in protective clothing of a composite fabric, said fabric containing as the essential component thereof a continuous film of a highly fluorinated ion exchange polymer having at least one kind of functional group selected from the group consisting of the alkali metal salts of, ammonium salts of and amine salts of at least one member of the group consisting of the sulfonic acid, sulfonamide, monosubstituted sulfonamide, carboxylic acid, carboxamide and monosubstituted carboxamide groups, there being at least one fluorine atom attached to each carbon atom to which each said functional group is attached, said polymer having an equivalent weight no greater than about 2000.

There is also provided according to the invention a protective garment fabricated at least in part from the composite fabric described in the previous paragraph.

DETAILED DESCRIPTION OF THE INVENTION

The composite fabric from which protective garments of the invention are made contains as the essential component thereof a continuous film or layer of a highly fluorinated ion exchange polymer having sulfonic acid and/or carboxylic acid functional groups, their amides or monosubstituted amides, each said group being in the form of an alkali metal salt, ammonium salt or amine salt, in all cases there being at least one and preferably two fluorine atoms attached to the carbon atom to which the sulfonic or carboxylic group is attached. By "highly fluorinated" is meant that the polymer in ion exchange form has at least as many C-F groups as it has C-H groups. Preferred amines from which the amine salts can be prepared include p-toluidine and triethanolamine. The monosubstituted sulfonamides referred to herein are known, as disclosed in U.S. Pat. No. 4,085,071, and the monosubstituted carboxylic amides are similar, i.e., derived from the same amines as the sulfonamides. The amides and monosubstituted amides have high $pK_a$ values, and salts of these forms revert back to the free amides when contacted with a solution below a pH of 10 to 12, depending on the amide; such salts revert to the free amides when contacted by perspiration. Additionally, films having the functional groups amide and substituted amide have, in general, higher permeability to organic substances than films having the other functional groups enumerated. Accordingly, the preferred functional groups are the sulfonic acid and/or carboxylic acid groups in the form of their alkali metal, ammonium or amine salts.

A film of a highly fluorinated ion exchange polymer having free sulfonic acid groups swells markedly when it absorbs water, and thus has been found not to be a preferred functional group when a high level of rejection of organic substances by the garment is required. However, the free sulfonic acid groups in such a polymer are easily converted to the alkali metal salt form by an aqueous solution of an alkali metal salt, which salt form of the polymer swells less. Although conversion of the sulfonic acid form to the sodium salt form can gradually occur during wearing of a garment simply from contact with the salt in perspiration, a garment of fabric having the polymer in the free sulfonic acid form would not initially provide the wearer with a high level of protection from organic substances until the entire garment had become completely saturated with his perspiration. Therefore, there is a substantial benefit of having the functional groups of the ion exchange polymer in the garment in the form of a salt initially, so as to provide immediate protection against most organic substances. It should also be noted that when NaCl interacts with —$SO_3H$ groups of a highly fluorinated ion exchange polymer to form —$SO_3Na$ groups, a dilute aqueous solution of hydrochloric acid is concurrently formed.

The highly fluorinated ion exchange polymers can be copolymers of fluorinated monomers containing the sulfonic or carboxylic functional group with nonfunctional monomers such as tetrafluoroethylene, trifluoroethylene, vinylidene fluoride, chlorotrifluoroethylene, etc. The polymers are preferably perfluorinated polymers prepared from perfluoro sulfonic or carboxylic monomers and tetrafluoroethylene. Such polymers and their preparation are now well-known in the art, and are described, e.g., in U.S. Pat. No. 3,282,875, Belgian Pat. No. 866,121, U.S. Pat. No. 4,116,888, and U.S. Pat. No. 4,151,053. Such polymers are unaffected by a large variety of chemicals including typical decontamination systems used after exposure of a protective garment to various toxic and harmful chemicals. Perfluorinated polymers of this type have retained good physical properties after exposure to chlorine gas and strong hot caustic solution within an operating chloralkali cell for times in excess of two years.

So as to have a high moisture permeability which will provide a garment having comfortable wearing properties, the highly fluorinated ion exchange polymer should have an equivalent weight of no greater than about 2000, preferably no greater than about 1500. (The equivalent weight of such a polymer is the number of grams of polymer which, when in $H^+$ form, provides one mol of hydrogen ion.) Equivalent weights as low as 1100 and even 1000 provide exceptionally high water vapor transmission rates. The water vapor transmission rates of fabrics containing a layer of such polymer is sufficiently high to permit the loss by permeation of enough perspiration so that a person wearing the garment is substantially more comfortable than he would be if wearing an impermeable garment. However, with increase in equivalent weight, the suppleness of the highly fluorinated ion exchange polymer increases, such polymer is more easily extruded in thinner films, and mechanical properties such as flex life improve; such factors can be considered when selecting the equivalent weight of the polymer to be used in any particular composite fabric.

The thickness of the layer of highly fluorinated ion exchange polymer is not critical to the permeation rate of water vapor, which is so high that it is almost independent of the thickness of the film in the range of thickness dealt with herein. In some cases where a garment is to protect the wearer from exposure to a harmful compound, extremely thin layers of the highly fluorinated ion exchange polymer may not be suitable. In those cases where the composite fabric is made by lamination of one or more component fabrics with a preformed film of the highly fluorinated ion exchange polymer or a precursor polymer thereof, the thickness of the film used is generally in the range of about 10 to 125 micrometers (about 0.4 to 5 mils), preferably about 10 to 50 micrometers. In those cases where one step in preparation of the composite fabric is coating a component fabric with a solution of the highly fluorinated ion exchange polymer or a precursor thereof followed by removal of the solvent by drying, composite fabrics containing a thinner layer of highly fluorinated ion exchange polymer, down to about 2.5 micrometers (0.1 mil) thick, and even down to about 1 micrometer (0.04 mil) thick, can be made. For garments intended for protecting the wearer from exposure to a harmful substance, the layer of highly fluorinated ion exchange polymer should be continuous, i.e., it should be substantially free of pinholes, so as to prevent leakage of organic substances to within the garment. A layer of highly fluorinated ion exchange polymer about 12 to 50 micrometers (0.5-2 mil) thick is most preferred.

The highly fluorinated ion exchange polymer should be of high enough molecular weight to be film forming and to have adequate toughness to survive conditions of wear without developing leaks which would destroy its integrity, and can be, e.g., linear or branched.

The component fabrics used in making the composite fabric are many and varied in type. They can be, but are not limited to, cotton, rayon, wool, silk, linen, polyester such as polyethylene terephthalate, polyamides such as polyhexamethylene adipamide, polyhexamethylene decanedicarboxamide, polyhexamethylene dodecanedicarboxamide, poly-epsilon-caproamide or the polyamide of bis-para-aminocyclohexylmethane and dodecanedicarboxylic acid, aramids such as polymetaphenylene isophthalamide or poly-para-phenylene terephthalamide, polyolefins such as polyethylene, polypropylene or polytetrafluoroethylene, acrylics such as polyacrylonitrile, polybenzimidazoles, polyarylene sulfides, polyarylene-imide-amides, polyphenolformaldehyde, polyimides, glass, flame-retardant cotton, etc., and blends of two or more of the foregoing. Carbonized cotton, acrylic, etc., fiber or fabric, or other adsorptive materials in any form such as activated carbon, can also be included as components of the composite fabrics. A component fabric can be woven, including, e.g., plain and ripstop weaves, knitted, nonwoven, felted, spunbonded, or poromeric fabric, or a fibrillated film, or a film or extrudate made or treated by any means to make it porous or microporous. In the case of such microporous component, those having a pore size of at least about 0.5 micrometer are preferred. Activated carbon or other adsorptive substances can be incorporated in the composite fabric by distributing it in a thin foamed layer included as one component of the composite fabric, or in any one layer or between two layers of said ion exchange polymer, or in any other suitable manner.

It is preferred that all of the components of the composite fabric of the invention, whether they be fabrics or continuous films, be hydrophilic in nature. The term "hydrophilic", when used in reference to a film, means that such film will transfer substantial amounts of water through the film by absorbing water on one side where the water vapor concentration is high, and desorbing or evaporating it on the opposite side where the water vapor concentration is low. The term "hydrophilic", when used in reference to a fabric, means that water will spread on the fabric and wick into its porous structure. In the case of those component fabrics listed in the previous paragraph which are not hydrophilic, such as microporous polytetrafluoroethylene fabric, it is preferred that they be impregnated throughout the structure and on both surfaces with sufficient hydrophilic polymer to render them, in effect, reinforced hydrophilic films; non-hydrophilic materials when so impregnated and coated lose their non-hydrophilic character and behave as hydrophilic components. Films of the highly fluorinated ion exchange polymers referred to hereinabove are hydrophilic, and such polymers are suitable for rendering hydrophilic those component fabrics which would otherwise be non-hydrophilic.

The composite fabric can take any of manifold forms. In addition to the layer of highly fluorinated ion exchange polymer, the composite fabric further comprises at least one layer of component fabric, preferably at least two layers of component fabric which may be the same or different. When the composite fabric contains at least two layers of component fabric, preferably there will be at least one layer of component fabric on each side of the layer of ion exchange polymer so as to provide protection to the latter from mechanical damage. It is further preferred to use as one of the outermost component fabrics a layer of a flame-resistant and/or wear-resistant fabric, and to fabricate the garment with such component fabric being on the outside of the garment.

A preferred embodiment of the composite fabric is that made from only one layer of component fabric in addition to the layer of highly fluorinated ion exchange polymer. Such composite fabric is intended to be used in a protective garment with the layer of highly fluorinated ion exchange polymer on the outside of the garment, and the component fabric side of the composite fabric on the inside of the garment; this orientation of the composite fabric presents a smooth, non-porous, barrier surface against a cloud of toxic gas or liquid droplets, and thereby does not absorb or trap any of the toxic substance in pores or interstices of the composite fabric, thus permitting easy decontamination after exposure to the toxic substance. Garments which are fabricated with a porous or microporous surface toward the outside, once contaminated by entrapment of a toxic substance in the pores, are at least extremely difficult, and often impossible, to decontaminate, and when decontamination is impossible must be carefully disposed of after but a single use. Those protective garments of the invention which do not contain a microporous layer are easily decontaminated, and thus provide for multiple reuse of the garment. With the indicated orientation of the composite fabric, there is the further advantage that when the inner layer of component fabric is hydrophilic, it soaks up perspiration and brings it into direct contact with the outer layer of moisture-transporting ion exchange polymer. Accordingly, the composite fabric of the invention which is an all hydrophilic construction possesses advantages over composite fabrics which contain a hydrophobic or microporous layer as a component thereof.

It should be noted that there are some situations in which the exposed outer layer of highly fluorinated ion exchange polymer could be damaged, in which case the loss of integrity of the barrier layer of the garment would endanger the person wearing the garment; in those situations, it is advisable that a wear-resistant outergarment be worn over the protective garment to aid in precluding damage to the latter. Such overgarments, following contamination, can either be laundered for reuse, or be of inexpensive, light-weight construction adapted for discarding after exposure to a toxic substance.

The composite fabric can be made from the component fabrics and either a film of highly fluorinated ion exchange polymer or a fabric either melt- or solution-coated with a continuous layer of highly fluorinated ion exchange polymer. The composite fabric is made in some cases by the use of heat and either vacuum or pressure, and in other cases by using suitable adhesives or meltable or soluble polymers to adhere the several components together. In some cases, the highly fluorinated ion exchange polymer is maintained in the form of a melt-fabricable precursor, e.g., with functional groups such as $-SO_2F$ or $-COOCH_3$, during formation of the composite fabric, and after the composite fabric has been made the melt-fabricable precursor is hydrolyzed or otherwise chemically modified to the ion exchange form defined above. Inasmuch as carboxylic esters having one or two fluorine atoms attached to the carbon atom to which the carboxylic ester group is attached are easily hydrolyzed under mild conditions to salts such as alkali metal and ammonium salts, melt pressing of film of fluorinated polymer having carboxylic ester groups followed by hydrolysis to carboxylic acid salt form is suitable even when a composite fabric containing a nylon, cotton or wool is to be prepared. In those cases where a precursor of a highly fluorinated ion exchange polymer having more difficultly hydrolyzable functional groups, such as $-SO_2F$ groups, is used in combination with a component fabric of polyolefin or polyfluorinated polyolefin, hydrolysis can be under any suitable conditions such as those used with hydrolysis bath A in the examples below, but when such a polymer is used in combination with a component fabric of a nylon, cotton, wool or other polymer which may be damaged by vigorous hydrolysis conditions, hydrolysis after fabrication of composite fabric prepared therefrom should be under milder conditions such as with ammonium hydroxide. A highly fluorinated ion exchange polymer having sulfonyl functionality can alternatively be put into the form of the sulfonic acid, sulfonamide or substituted sulfonamide, or an alkali metal, ammonium or amine salt thereof before forming a composite fabric therefrom, and in such cases the composite fabric can be prepared by using a small amount of a highly fluorinated ion exchange polymer having, e.g., $-COOCH_3$ functional groups as an adhesive bonding agent, which, as indicated above, can be hydrolyzed under mild conditions, or by using other types of adhesive such as ethylene/vinyl acetate based hot melt adhesives or two-component epoxy adhesives. Composite fabrics made without an adhesive bonding agent are preferred, inasmuch as most bonding agents interfere with passage of water through the composite fabric, and to the extent used, reduce the active area through which water permeates. If such an adhesive bonding agent is used, a highly fluorinated ion exchange polymer having, e.g., $-COOCH_3$ functional groups is preferred, as it can be hydrolyzed to alkali metal carboxylate form which has a high permeability to water; such polymers are known in the art, e.g., in Belgian Pat. No. 866,121. The techniques with adhesives can also be used if desired with films of the fluorinated polymers having carboxylic functionality. The various salt forms of a functional group can freely be interconverted from one to another, and to or from the free acid form, in either a component material or a composite fabric, as desired, by treatment with a solution containing the cation of the desired form. The composite fabric can be made from the components in some cases in a single operation, and in other cases by a series of sequential steps.

The composite fabrics described above can be used in fabrication of protective garments by techniques known in the art, including sealing of seams and joints by use of radio frequency heating or other known electronic bonding techniques, or by heat and pressure, in some cases with the aid of adhesives or sealants at the seams and joints to prevent leaks at those points. Garments can also be made by sewing, but in cases where a leak-free construction is desired the sewn seams should also contain a sealant or adhesive.

The composite fabrics and garments made therefrom are highly permeable to water vapor. Accordingly, a person wearing such a garment does not suffer heat stress which results from interruption of the usual mechanism of loss of body heat by evaporation of the water of perspiration, and discomfort from the retention of the water of perspiration within the garment is reduced. While the composite fabrics are also permeable to a few low molecular weight organic compounds such as methanol and ethanol, and while the permeation rate for an organic compound depends on the type of compound and its molecular weight, the permeation rates for most organic compounds are extremely low and in the case of many organic compounds the composite fabric is substantially impermeable to the compound. It is believed that the composite fabrics described herein possess barrier properties against a variety of hazardous substances, poisonous compounds, blistering agents, lachrymators, and irritants. In the examples to follow, among the compounds used in testing the permeability of composite fabrics were two organic compounds, 2-chloroethyl ether and n-propyl sulfide, chosen as model compounds to simulate 2-chloroethyl sulfide. As will be seen, the composite fabrics have very low permeabilities to the model compounds while still permitting the passage of large amounts of water vapor.

The composite fabrics have good mechanical properties, such as toughness, strength and flex life. Both the composite fabrics and garments fabricated from them have good storage stability, such that the garments can be retained for long periods before actual use of them.

To further illustrate the innovative aspects of the present invention, the following examples are provided.

In the examples, water permeabilities were measured in accordance with ASTM (American Society for Testing Materials) method E 96-66, using the upright or inverted cup techniques as indicated. Permeabilities to substances other than water were measured by a similar technique, except at uncontrolled, ambient relative humidity.

EXAMPLE 1

A clear solution of 0.1674 g of a copolymer of perfluoro(3,6-dioxa-4-methyl-7-octenesulfonyl fluoride) (referred to herein as PSEPVE) and tetrafluoroethylene (referred to herein as TFE) having an equivalent weight of 971 in 20 g of 7,8-dibromo-perfluoro(3,6-dioxa-4-methyl-7-octenesulfonyl fluoride) (referred to herein as BrPSEPVE) was prepared by heating the mixture overnight at 150° C.

A round piece of a microporous polytetrafluoroethylene cloth having a thickness of 127 micrometers (5 mils), a porosity of 80% and an average pore size of 0.5 micrometers (the cloth having a microstructure characterized by nodes interconnected by fibrils, made by high-rate stretching at an elevated temperature of an unsintered, dried paste extrudate of polytetrafluoroethylene, as described in U.S. Pat. No. 3,962,153, and commercially available from W. L. Gore & Associates, Inc., under the trademark Gore-Tex) was placed on the fritted plate of a 9-cm Buchner funnel. With vacuum applied from below, 3 ml of the above solution was poured onto the cloth. After about 3 minutes the cloth become transparent, which indicated penetration of the solution through the cloth, the vacuum was then broken, and one surface of the cloth was rinsed with 2 ml of BrPSEPVE. The impregnated cloth was removed from the funnel, placed on a glass plate to keep it flat, dried in an oven under vacuum at 120° C. for 5 hours, and cooled. The composite fabric was found to be free of leaks by testing with a vacuum 0.84 Atmospheres (25 inches of mercury) below atmospheric pressure.

EXAMPLE 2

The procedure of Example 1 was substantially repeated except that the surface of the solution-impregnated cloth was washed on one side with 1,1,2-trichloro-1,2,2,-trifluoroethane (instead of BrPSEPVE), which produced an asymmetrically coated cloth. The coated cloth was hydrolyzed in a hydrolysis bath consisting of 15% by wt. potassium hydroxide, 25% by wt. dimethylsulfoxide and 60% by wt. water (referred to herein as hydrolysis bath A) at 100° C. for 1 hour, then soaked in a 10% by weight sodium hydroxide solution to transform the hydrolyzed functional groups to the $-SO_3Na$ form, and dried. The coating weight was found to be 1.5 mg of ion exchange polymer/cm$^2$ of fabric. Samples of the coated cloth were tested for permeability to several organic compounds as indicated in Table 1, by the upright cup method.

TABLE 1

| Compound | Vapor transmission, g/m$^2$ day | |
|---|---|---|
| | Coated | Uncoated |
| hexane | 1,800 | 11,000 |
| toluene | 210 | 2,300 |
| carbon disulfide | 4,900 | 38,200 |

EXAMPLE 3

The procedure of Example 2 was substantially repeated except that the PSEPVE/TFE copolymer had an equivalent weight of 1075. The coating weight was found to be in the range of 1–1.5 mg of ion exchange polymer/cm$^2$ of fabric. Part of the coated fabric was hydrolyzed in hydrolysis bath A to the $-SO_3K$ form, which was then converted to $-SO_3Na$ form as in Example 2; water permeabilities by the upright cup method were 750 g/m$^2$ day for uncoated fabric, and 670 g/m$^2$ day for the coated fabric in $-SO_3Na$ form. These water permeability rates appear somewhat low, but it was subsequently found that in the case of materials which have high water permeability rates, as is the case here, the water permeability rate measured by the inverted cup method is both substantially higher and more realistic; accordingly, higher water permeability rates would have been observed in this example if the inverted cup method had been used.

Another part of the coated fabric in the $-SO_2F$ form was treated on the side carrying the PSEPVE/TFE coating with ethylenediamine (EDA) for 1 minute, then washed with water, hydrolyzed in hydrolysis bath A, washed with water again and dried. The resulting fabric had, on the treated surface, polymer with monosubstituted sulfonamide groups derived from ethylenediamine in the sodium salt form. The latter and the fabric in $-SO_3Na$ form were tested for permeability to 2-chloroethyl ether by the inverted cup method, with results as shown in Table 2.

TABLE 2

| Fabric | Vapor transmission, g/m² day |
| --- | --- |
| —SO₃Na form | 760 |
| EDA modified, in Na form | 490 |
| uncoated control | 4780 |

EXAMPLE 4

A clear solution of 0.1239 g of a copolymer of methyl perfluoro(4,7-dioxa-5-methyl-8-nonenoate) (referred to herein as MPDMN) and tetrafluoroethylene having an equivalent weight of 1050 in 20 g of BrPSEPVE was prepared by heating the mixture overnight at 150° C.

Another piece of polytetrafluoroethylene cloth of the kind described in Example 1 was presoaked in acetone and placed on the fritted plate of a 9-cm Buchner funnel. With vacuum applied from below, 5 ml of the above solution was poured onto the cloth. The solution permeated the fabric rapidly. The vacuum was broken, and the impregnated cloth was rinsed with 2 ml of BrPSEPVE and dried. The coated cloth was found to be free of leaks by testing with a vacuum 0.84 Atmospheres below atmospheric pressure.

EXAMPLE 5

The procedure of Example 2 was substantially repeated except that the coating solution was like that prepared in the first paragraph of Example 4. The coated cloth was hydrolyzed by soaking it in a 10% aqueous solution of sodium hydroxide at 80° C., washed in water, and dried. The coating weight was found to be in the range of 1 to 1.5 mg of ion exchange polymer/cm² of fabric. Samples of the coated cloth were tested for permeability to two organic compounds as indicated in Table 3, by the inverted cup method.

TABLE 3

| | Vapor transmission, g/m² day | |
| --- | --- | --- |
| Compound | Coated | Uncoated |
| 2-chloroethyl ether | 19.8 | 4,780 |
| n-propyl sulfide | 380 | 12,600* |

*minimum value, as the cup was empty at the end of the test.

EXAMPLE 6

A piece, 8 cm in diameter, of a microporous polytetrafluoroethylene cloth as described in Example 1, and a piece, 8 cm in diameter, of a film of a PSEPVE/TFE copolymer having an equivalent weight of 1075 and a thickness of 127 micrometers (5 mils) were placed in contact with one another between two larger films of the polyimide based on 4-aminophenyl ether and pyromellitic dianhydride which served as release sheets. The whole assembly was placed in a hydraulic press having platens 20 cm by 20 cm. The assembly was heated at 255° C. for 1 minute with a force of 16,000 kg, which calculates to an initial pressure on the cloth and PSEPVE/TFE film of approximately 320 kg/cm² (31.4 megapascals). The resulting composite fabric had a thickness of 102 micrometers (4 mils), and was almost transparent. The composite fabric resisted attempts to delaminate it by creasing or with a razor blade, and it was concluded that the component cloth and film were well adhered, and that some penetration of the PSEPVE/TFE copolymer into the pores of the component fabric had occurred.

EXAMPLE 7

The procedure of Example 6 was substantially repeated. The resulting composite fabric was treated with hydrolysis bath A at 100° C. for 1 hour to hydrolyze the functional groups to —SO₃K form, washed and dried. Samples of the composite fabric of the component uncoated fabric, and of the component PSEPVE/TFE copolymer film hydrolyzed and converted to —SO₃Na form were tested for permeability to 2-chloroethyl ether by the inverted cup method. The permeability of the uncoated component fabric was 4,780 g/m² day, of the component copolymer film in —SO₃Na form was 0.8 g/m² day, and of the composite fabric in —SO₃K form was 7 g/m² day. It was observed, however, that the transmission rate of the latter sample progressively decreased considerably over the two-day period during which the permeation test was carried out.

EXAMPLE 8

The procedure of Example 6 was substantially repeated except that the thickness of the microporous polytetrafluoroethylene cloth was 25 micrometers (1 mil), the piece of PSEPVE/TFE film used was 125 micrometers (5 mils) thick and was smaller in diameter than the piece of cloth used but it spread to a larger size during pressing, the temperature used in the hydraulic press was 270° C., and the resulting composite fabric had a thickness of 25 micrometers. The composite fabric was treated with hydrolysis bath A to put the functional groups of the PSEPVE/TFE polymer in —SO₃K form, washed and dried. Samples of the composite fabric in —SO₃K form were tested for permeability. Permeability to water by the inverted cup method was 15,000 g/m² day, and to 2-chloroethyl ether by the inverted cup method was 4 g/m² day.

EXAMPLE 9

Samples of PSEPVE/TFE film having an equivalent weight of 1075 and thickness of 127 micrometers were hydrolyzed to —SO₃K form with hydrolysis bath A, the functional groups in one portion of the film were converted to —SO₃Na form by soaking in a 10% by wt. aqueous solution of NaOH, in another portion of the film to —SO₃Cs form similarly with an aqueous CsOH solution, and in yet another portion of the film to —SO₃H form by treatment with aqueous hydrochloric acid. Permeabilities to various substances were determined as indicated in Table 4 by the inverted cup method.

TABLE 4

| Metal ion of functional group | Compound | Vapor transmission, g/m² day |
| --- | --- | --- |
| Na | methanol | 29,000 |
| Na | chloroform | 5.9 |
| Na | hexane | 4.8 |
| Na | carbon tetrachloride | 5 |
| Na | toluene | 8.6 |
| Na | CFCl₂CF₂Cl | 6.3 |
| Cs | methanol | 612 |
| Cs | carbon tetrachloride | 0.8 |
| H | hexane | 1.65 |
| H | toluene | 6.25 |

EXAMPLE 10

The procedure of Example 6 was substantially repeated except that the film used was a copolymer of MPDMN (see Example 4) and TFE having an equivalent weight of 1050 and a thickness of 51 micrometers (2 mils), 10-cm diameter pieces of component cloth and copolymer film were used, and the conditions in the hydraulic press were 250° C. and a force of 13,500 kg, which calculates to an initial pressure of about 172 kg/cm$^2$ (16.9 megapascals). The composite fabric was treated with hydrolysis bath A, washed and dried in air. A sample of the resulting composite fabric, with functional groups in —COOK form, was tested for permeability to 2-chloroethyl ether by the inverted cup method, and found to be 17.5 g/m$^2$ day.

EXAMPLE 11

A piece, 10 cm in diameter, of a component fabric having 27.5 threads/cm (70 threads/in) of 1.5 denier filaments of poly-meta-phenylene isophthalamide in the warp and 19 threads/cm (48 threads/in) of like filaments in the woof in a plain weave, having a weight of 15 mg/cm$^2$, and a piece, 10 cm in diameter, of a film of a PSEPVE/TFE copolymer having an equivalent weight of 1100 and a thickness of 127 micrometers (5 mils) and having the functional groups in the form of the sulfonic acid p-toluidine salt (made by hydrolysis of the PSEPVE/TFE copolymer in hydrolysis bath A, followed by conversion to the —SO$_3$H form and subsequent treatment with p-toluidine) were placed in contact with one another between two polyimide films as described in Example 6. The whole assembly was placed in a hydraulic press (20-cm by 20-cm platens) and heated at 220° C. for 1 minute with a force of 4500 kg, which calculates to an initial pressure of about 57 kg/cm$^2$ (5.6 megapascals). The resulting composite fabric was found free of leaks when tested with air. The composite fabric was placed in 5% aqueous potassium hydroxide solution overnight to convert the functional groups of the copolymer to —SO$_3$K groups, washed and dried, and again found to be free of leaks when tested with air. Samples of the composite fabric with functional groups in the —SO$_3$K form were tested for permeability by the inverted cup method. Permeability to water was 2800 g/m$^2$ day, and to 2-chloroethyl ether was 0.5 g/m$^2$ day.

In Examples 12 and 13 apparatus for continuous preparation of composite fabric was employed which comprised a hollow roll with an internal heater and an internal vacuum source. The hollow roll contained a series of circumferential slots on its surface which allowed the internal vacuum source to draw component materials in the direction of the hollow roll. A curved stationary plate with a radiant heater faced the top surface of the hollow roll with a spacing of about 6 mm (¼ inch) between their two surfaces.

During a lamination run, porous release paper was used in contacting the hollow roll as a support material to prevent adherence of any component material to the roll surface and to allow vacuum to pull component materials in the direction of the hollow roll. Feed and takeoff means were provided for the component materials and product. In the feed means one idler roll of smaller diameter than the hollow roll was provided for release paper and component materials. The feed and takeoff means were positioned to allow component materials to pass around the hollow roll over a length of about 5/6 of its circumference. A further idler roll was provided for the release paper allowing its separation from the other materials. Takeoff means were provided for the release paper and a composite fabric.

EXAMPLE 12

A composite fabric was prepared from (1) a piece of component fabric as described in Example 11 about 10 cm by 15 cm, and (2) a piece of a film of a PSEPVE/TFE copolymer having an equivalent weight of 1350, the film having a thickness of about 36 micrometers (1.4 mils) and being hydrolyzed on one surface only to a depth of about 15 micrometers (0.6 mil) to the —SO$_3$K form, the piece of film being slightly larger than the piece of fabric. The lamination was carried out in the apparatus just described, using a web of paper with a window cut in it to carry the components through the apparatus. The piece of fabric was taped into the window, and the piece of film was taped over the fabric. As measured by thermocouples, the hollow roll was heated to 240° C. by the internal heaters and the temperature indicated by a thermocouple at the radiant heaters was 360° C. The vacuum in the hollow roll was 0.84 Atmospheres below atmospheric pressure. The line was run at 30 cm/minute (1 ft/min), to provide a dwell time in the heated portion of the apparatus of 1.5 minutes. During lamination, the component cloth contacted the release paper on the heated hollow roll, and the film was placed with its unhydrolyzed side, i.e., the —SO$_2$F side, against the component fabric.

In the resulting composite fabric, the film was pulled deep into the surface contour of the fabric but not into the interior; the yarn crossover points of the fabric were not bonded together, and the composite fabric had a good hand.

The composite fabric was placed in a solution of 50 volume % methanol and 50 volume % of 28% aqueous ammonium hydroxide at ambient room temperature, about 18° C., for 45 hours, to hydrolyze the remaining —SO$_2$F groups. The composite fabric with sulfonic acid ammonium salt functional groups was then treated for 1 minute with 1N aqueous hydrochloric acid to put the functional groups into —SO$_3$H form, and part of that composite fabric was treated with aqueous NaCl solution to make the —SO$_3$Na form. The acid (hydrogen) and sodium salt forms were tested for water vapor permeability by the inverted cup method, with results as shown in Table 5.

TABLE 5

| Form and orientation | Vapor transmission g/m$^2$ day |
|---|---|
| H form, component fabric facing water in the cup | 25,570 |
| Na form, component fabric facing water in the cup | 28,780 |
| Na form, component fabric facing outside the cup | 7,300 |

EXAMPLE 13

A composite fabric was prepared from continuous lengths of (1) a component fabric of 40/2 cc yarns of a 50:50 blend of poly-meta-phenylene isophthalamide and poly-para-phenylene terephthalamide staple fibers woven in a 2 by 1 twill as described in Example 2 of U.S. Pat. No. 4,120,914, (fabric E) and (2) a film like that employed in Example 12 above. The lamination was carried out in the same apparatus just described, with the same conditions as in Example 12 except that the vacuum in the hollow roll was 0.675 Atmospheres below atmospheric pressure. As in Example 12, the component cloth contacted the release paper on the heated hollow roll, and the film was placed with its unhydrolyzed side against the component fabric. The composite fabric so made (fabric G) was found to be free of leaks. Half of the composite fabric so made was placed in a solution of 60% by volume of methanol and 40% by volume of 28% aqueous ammonium hydroxide at about 18° C. for 65 hours to hydrolyze the remaining —$SO_2F$ groups, washed with water, washed with an aqueous solution containing 2% by wt. acetic acid and 1% by wt. sodium chloride, washed with water, and air dried, the ion exchange groups of the resulting composite fabric (fabric F) being in the Na form. One sample of the resulting composite fabric was placed in boiling water for 30 minutes before testing for water permeability. Another sample of the same composite fabric was soaked in 2N hydrochloric acid to prepare the —$SO_3H$ form, washed with water, soaked in water at 60° C. for 20 minutes, and air dried. Samples were tested for water permeability, in all cases by the inverted cup method and with the component fabric side of the composite fabric facing the water in the cup, with the results shown in Table 6.

TABLE 6

| Form | Vapor transmission g/m² day |
|---|---|
| Na form as first prepared | 8,530 |
| Na form after treatment in boiling water | 28,470 |
| H form | 32,530 |

It should be noted that treatment of a highly fluorinated ion exchange polymer with water at high temperture, such as with boiling water, is known to cause the polymer to swell (see U.S. Pat. No. 3,684,747).

EXAMPLE 14

A composite fabric was prepared from continuous lengths of (1) a component fabric which was a 22 cut jersey having a weight of 15.6 mg/cm² (4.6 oz/sq yd) knit from 20/1 cc yarn of poly-meta-phenylene isophthalamide, and (2) a film like that employed in Example 12 above. The lamination was carried out with the same apparatus and in the same manner as described in Example 13, and the composite fabric so made was hydrolyzed in the same manner as in Example 13. The resulting hydrolyzed composite fabric felt softer than the composite fabrics of Examples 12 and 13, and had some stretch characteristics. A portion of the composite fabric was converted to hydrogen form by treating with aqueous hydrochloric acid, and another portion was converted to sodium form by treating with aqueous NaCl solution. Permeabilities to water were measured by the inverted cup technique, with the component fabric side of the composite fabric facing the water in the cup, with the results shown in Table 7.

TABLE 7

| Form | Vapor transmission g/m² day |
|---|---|
| H | 14,030 |
| Na | 16,030 |

EXAMPLE 15

Heat Stress Tests.

For these tests, three tightly fitting jumpsuits were fabricated. Each suit was made to cover the trunk and limbs of the person wearing it to the neck, wrists and ankles. The jumpsuits were fabricated by sewing, and straps at the wrists and ankles provided a snug fit at those places.

Jumpsuit F was made from the composite fabric F of Example 13 (Na form as first prepared).

Jumpsuit G was made from fabric G of Example 13, and, in view of the film layer of this fabric still having about 21 micrometers (0.8 mil) of its thickness in the —$SO_2F$ form, was employed as a control having essentially no permeability to water.

Jumpsuit E was made from fabric E referred to in Example 13, the component fabric used in making fabrics F and G, and was employed as a control having a high permeability to water.

Three persons were employed in the tests. Each person wore each of the three jumpsuits at different times during the tests, and the test results reported below for each jumpsuit are averages of the data taken from all three persons. During the tests, the persons wore a jumpsuit over light undershorts, and wore foot coverings, but no gloves or head covering. The persons wearing the jumpsuits exercized on a treadmill while their heart response and body temperature (rectal) were monitored. The maximum pulse rate and body temperature rise while exercising in jumpsuit F were midway between those while wearing jumpsuit E or G. The results are summarized in Table 8.

TABLE 8

| | Jumpsuit E | Jumpsuit F | Jumpsuit G |
|---|---|---|---|
| Heartbeats/min, maximum | 155 | 161 | 165 |
| Heartbeats/min, averaged over 5-minute recovery period | 110 | 123 | 123 |
| Maximum rise in body temperature, °C. | 0.82 | 0.98 | 1.17 |
| Maximum rise in body temperature, °F. | 1.47 | 1.77 | 2.10 |

These data indicate that the garment of the invention, jumpsuit F, reduced heat stress, and would extend personnel operational time, compared to the impermeable garment, jumpsuit G. Subjective comments from the persons wearing the jumpsuits support this conclusion, in that they rated the comfort of jumpsuit F as intermediate between that of jumpsuits E and G. Additionally, at the end of the test periods, the exterior surface of jumpsuit F felt cooler than the exterior surface of jumpsuit G, which indicates that evaporative cooling on the surface of jumpsuit F was occurring.

EXAMPLE 16

Heat-stress tests.

The relative comfort of three different materials was subjectively determined by wrapping a man's thumb for several hours with each material. In each case after the material was wrapped around the thumb it was held in place with cellophane tape.

In the first test, the man's thumb was wrapped in the thumb portion cut from a commercially available disposable glove of polyvinyl chloride (PVC) film 30 micrometers thick. This was rated least comfortable of the three.

In the second test, performed simultaneously, the film used for wrapping the same man's other thumb was made by heating under pressure a piece, 16 cm in diameter, of a microporous polytetrafluoroethylene cloth (of the type described in Example 1) having an average pore size of 0.5 micrometers and a thickness of 25 micrometers, and a piece, 10.5 cm in diameter, of a film of a PSEPVE/TFE copolymer having an equivalent weight of 1200 and a thickness of 51 micrometers (2 mils) in a hydraulic press at 290° C. for 1 minute and a force of 18,000 kg, which calculates, after the copolymer film has spread to the same size as the cloth, to a pressure of about 90 kg/cm$^2$ (8.8 megapascals), following which the resulting composite fabric was treated with hydrolysis bath A at 100° C. for 1 hour to put the functional groups of the copolymer in the —SO$_3$K form. The resulting composite fabric was very flexible and quite transparent. It was rated as more comfortable than the PVC film.

In the third test, the same thumb previously used for the second test was first wrapped with a piece of microporous polytetrafluoroethylene cloth (of the type described in Example 1) having an average pore size of 0.5 micrometers and a thickness of 127 micrometers, and then overwrapped with a layer of the composite fabric described in the second test (see previous paragraph). This combination was the best of the three, and found to be very comfortable.

EXAMPLE 17

Flame resistance tests.

The procedure for preparing a composite fabric described under the second test of Example 14 was substantially repeated, except that the film of PSEPVE/TFE copolymer had an equivalent weight of 1100 and a thickness of 25 micrometers (1 mil), and the components were bonded in a hydraulic press at 240° C. with a force of 30,000 kg. The resulting transparent, leak free, composite fabric was treated with hydrolysis bath A to put the functional groups of the copolymer in —SO$_3$K form, washed and dried, and flame tested. In the flame test, a piece of the composite fabric, 12 cm by 4 cm, was held horizontally by metal clamps in the flame 3 cm above a burning wooden match for 15 seconds. The composite fabric did not burn; there was slight charring without destroying the fabric. The behavior was the same when the flame was applied either to the center or to the edge of the film.

In a second test, a piece of the composite fabric prepared for the second test of Example 16 was held vertically, and the flame of a propane torch was applied to the edge of the fabric. The fabric ignited only when the hot, inner, blue cone of the flame impinged on the fabric. The fabric was self-extinguishing, i.e., the fabric stopped burning when the flame was removed.

COMPARATIVE EXAMPLES A, B, C, AND D

In Example A, permeabilities were measured for a film of regenerated cellulose (cellophane) having a thickness of 25 micrometers (1 mil). Although it has a high water vapor permeability, in excess of 10,000 g/m$^2$ day, and, by the inverted cup method had a permeability of 36 g/m$^2$ day to 2-chloroethyl ether and of 11 g/m$^2$ day to n-propyl sulfide, it shatters and tears when mechanically abused and it makes noise when flexed, and was thus considered unsuitable for use as a component of a composite fabric.

In Example B, a chlorinated polyethylene fabric (commercially available under the name "Chloropel") was found to have a permeability of 3000 g/m$^2$ day for 2-chloroethyl ether, which is so high as to make it unsuitable as a component of a composite fabric for protective garments. The material was also swollen and delaminated where contacted by 2-chloroethyl ether.

In Example C, a film 127 micrometers thick of a copolymer of ethylene and methacrylic acid having an equivalent weight of 576 was tested for permeability in both the free acid (hydrogen) form and in the sodium salt form. Although the permeability (inverted cup) to 2-chloroethyl ether was considered good, 8.8 g/m$^2$ day in the sodium form and 6.2 g/m$^2$ day in the hydrogen form, the permeability (inverted cup) to water vapor was 1690 g/m$^2$ day in the sodium form and 5 g/m$^2$ day in the hydrogen form, these values for water being considered too low to provide the comfort level desired for a protective garment.

In Example D, a membrane comprising a film of a polystyrenesulfonic acid having an ion exchange capacity of 2.7 meq/g of dry resin, backed by a fabric of vinyl chloride/acrylonitrile fibers having a weight of 14 mg/cm$^2$ and being 34% by wt. of the membrane, the membrane thickness being 0.6 mm (commercially available from Ionics, Inc.) was found to have a permeability (inverted cup) of 19,600 g/m$^2$ day for water vapor, and of 1,640 g/m$^2$ day for 2-chloroethyl ether.

INDUSTRIAL APPLICABILITY

Composite fabrics containing a continuous film of a highly fluorinated ion exchange polymer as defined herein are useful in protective garments such as jackets, trousers, complete suits hermetically sealed, gloves, boots, hats, head coverings, masks, etc. The garments are broadly useful for providing protection to workers in the chemical industry, firemen, forest fire fighters, race car drivers, crop dusters and airplane pilots, and they may have value for defensive use by military personnel. The garments provided herein are technically advanced over those previously known in that they readily permit loss of perspiration and body heat while providing the needed protection. The garments are also waterproof in the sense that gross amounts of liquid will not penetrate the ion exchange film. The water entry pressure of the composite fabric is an order of magnitude above that of ordinary waterproof fabrics. Garments of the composite fabrics are virtually "watertight", yet "breathable". The composite fabrics can also be used for rain or water protection in any kind of rainwear, such as rainsuits, coats, parkas, ponchos, slickers, etc., and for other uses such as tents, shelters such as command posts, tarpaulins and other waterproof protective covers for vehicles, etc.

We claim:

1. Use in protective clothing of a composite fabric, said composite fabric containing in adherent contact at least one layer of component fabric, and, as the essential component thereof, a continuous film of a highly fluorinated ion exchange polymer having at least one kind of functional group selected from the group consisting of the alkali metal salts of, ammonium salts of and amine salts of at least one member of the group consisting of the sulfonic acid, sulfonamide, monosubstituted sulfonamide, carboxylic acid, carboxamide and monosubstituted carboxamide groups, there being at least one fluorine atom attached to each carbon atom to which each said functional group is attached, said polymer having an equivalent weight no greater than about 2000.

2. The use set forth in claim 1 wherein all of the components of said composite fabric are hydrophilic.

3. The use set forth in claim 2 wherein said polymer is a perfluorinated polymer.

4. The use set forth in claim 3 wherein said functional groups are sulfonic acid alkali metal, ammonium or amine salt groups.

5. The use set forth in claim 4 wherein said functional groups are sulfonic acid alkali metal salt groups.

6. The use set forth in claim 3 wherein said functional groups are carboxylic acid alkali metal, ammonium or amine salt groups.

7. The use set forth in claim 6 wherein said functional groups are carboxylic acid alkali metal salt groups.

8. The use set forth in claim 5 or 7 wherein said polymer has an equivalent weight no greater than about 1500, and the thickness of said film is in the range of about 2.5 to 125 micrometers.

9. The use set forth in claim 8 wherein the thickness of said film is in the range of about 10 to 50 micrometers.

10. The use set forth in claim 1 wherein a said component fabric is a microporous polyolefin cloth.

11. The use set forth in claim 10 wherein said polyolefin is polytetrafluoroethylene or polypropylene.

12. The use set forth in claim 1 or 2 wherein a said component fabric is a fabric of fibers of poly-meta-phenylene isophthalamide or poly-para-phenylene terephthalamide or a blend thereof.

13. The use set forth in claim 1 or 2 wherein a said component fabric is a fabric of fibers of polyhexamethylene adipamide, polyhexamethylene decanedicarboxamide, polyhexamethylene dodecanedicarboxamide, poly-epsilon-caproamide or the polyamide of bis-para-aminocyclohexylmethane and dodecanedicarboxylic acid.

14. A protective garment fabricated at least in part from a composite fabric, said composite fabric containing in adherent contact at least one layer of component fabric, and, as the essential component thereof, a continuous film of a highly fluorinated ion exchange polymer having at least one kind of functional group selected from the group consisting of the alkali metal salts of, ammonium salts of and amine salts of at least one member of the group consisting of the sulfonic acid, sulfonamide, monosubstituted sulfonamide, carboxylic acid, carboxamide and monosubstituted carboxamide groups, there being at least one fluorine atom attached to each carbon atom to which each said functional group is attached, said polymer having an equivalent weight no greater than about 2000.

15. The protective garment of claim 14 wherein all of the components of said composite fabric are hydrophilic.

16. The protective garment of claim 15 wherein said polymer is a perfluorinated polymer.

17. The protective garment of claim 16 wherein said functional groups are sulfonic acid alkali metal, ammonium or amine salt groups.

18. The protective garment of claim 17 wherein said functional groups are sulfonic acid alkali metal salt groups.

19. The protective garment of claim 16 wherein said functional groups are carboxylic acid alkali metal, ammonium or amine salt groups.

20. The protective garment of claim 19 wherein said functional groups are carboxylic acid alkali metal salt groups.

21. The protective garment of claim 18 or 20 wherein said polymer has an equivalent weight no greater than about 1500, and the thickness of said film is in the range of about 2.5 to 125 micrometers.

22. The protective garment of claim 21 wherein the thickness of said film is in the range of about 10 to 50 micrometers.

23. The protective garmet of claim 15 wherein a said component fabric is a fabric of fibers of poly-meta-phenylene isophthalamide or poly-para-phenylene terephthalamide or a blend thereof.

24. The protective garment of claim 15 wherein a said component fabric is a fabric of fibers of polyhexamethylene adipamide, polyhexamethylene decanedicarboxamide, polyhexamethylene dodecanedicarboxamide, poly-epsilon-caproamide or the polyamide of bis-para-aminocyclohexylmethane and dodecanedicarboxylic acid.

25. The protective garment of claim 14 wherein a said component fabric is a microporous polyolefin cloth.

26. The protective garment of claim 25 wherein said polyolefin is polytetrafluoroethylene or polypropylene.

27. The protective garment of claim 14, 18, 23 or 24 wherein said composite fabric consists of one layer of said continuous film and one layer of component fabric, and said garment if fabricated from said composite fabric such that said film is disposed toward the outside of said garment and said component fabric is disposed toward the inside of said grament.

28. A composite fabric comprising a microporous polytetrafluoroethylene cloth and a continuous film of a highly fluorinated ion exchange polymer having at least one kind of functional group selected from the group consisting of the alkali metal salts of, ammonium salts of and amine salts of at least one member of the group consisting of the sulfonic acid, sulfonamide, monosubstituted sulfonamide, carboxylic acid, carboxamide and monosubstituted carboxamide groups, there being at least one fluorine atom attached to each carbon atom to which each said functional group is attached, said polymer having an equivalent weight no greater than about 2000.

29. The composite fabric of claim 28 wherein said composite fabric further comprises at least one other component fabric.

30. A waterproof protective cover fabricated at least in part from a composite fabric, said fabric containing as the essential component thereof a continuous film of a highly fluorinated ion exchange polymer having at least one kind of functional group selected from the group consisting of the alkali metal salts of, ammonium salts of and amine salts of at least one member of the group consisting of the sulfonic acid, sulfonamide, monosubstituted sulfonamide, carboxylic acid, carboxamide and monosubstituted carboxamide groups, there being at least one fluorine atom attached to each carbon atom to which each said functional group is attached, said polymer having an equivalent weight no greater than about 2000.

31. The waterproof protective cover of claim 30 wherein said cover is a tent or shelter.

32. The waterproof protective cover of claim 30 wherein said cover is a tarpaulin.

33. A process comprising (a) placing a barrier between a first space which contains water or water vapor adjacent a first side of said barrier and a second space which contains hazardous substance adjacent the second side of said barrier, said barrier having as the essential component thereof a continuous film of a highly fluorinated ion exchange polymer having at least one kind of functional group selected from the group consisting of the alkali metal salts of, ammonium salts of and amine salts of at least one member of the group consisting of the sulfonic acid, sulfonamide, monosubstituted sulfonamide, carboxylic acid, carboxamide and monosubstituted carboxamide groups, there being at least one fluorine atom attached to each carbon atom to which each said sulfonic acid group is attached, said polymer having an equivalent weight no greater than about 2000, (b) permeation of water from said first space through said barrier into said second space, and (c) permeation of said hazardous substance in said second space only slowly into said barrier, whereby the rate of penetration of said hazardous substance into said first space is substantially decreased.

* * * * *